United States Patent [19]

Savage

[11] 3,987,999

[45] Oct. 26, 1976

[54] PRECISION METERING VALVE STRUCTURE

[76] Inventor: Harry A. Savage, Bellwood Rte. No. 2, Box 41, Greenwood, Ark. 72936

[22] Filed: Sept. 22, 1975

[21] Appl. No.: 615,418

[52] U.S. Cl. ............................... 251/205; 251/340
[51] Int. Cl.² ............................................ F16K 5/12
[58] Field of Search ........................... 251/205, 340

[56] References Cited
UNITED STATES PATENTS

| | | | |
|---|---|---|---|
| 3,093,155 | 6/1953 | Dawes | 251/340 X |
| 3,139,262 | 6/1964 | Morris et al. | 251/205 |

*Primary Examiner*—Arnold Rosenthal
*Attorney, Agent, or Firm*—Salvatore G. Militana

[57] ABSTRACT

A metering valve device being particularly adapted for the precision control of metering minute quantities of fluids and the like from a high pressure environment to a low pressure environment, even to a vacuum. The metering valve device having a cylindrical core and an inlet and an outlet. The inlet is connected to a radially disposed duct that extends to and forms an opening on the surface of the core, while the outlet is connected to a V-shaped slot positioned on the surface of the core in space relation to the opening. A sleeve that is slidably mounted on the core has a portion that forms a leakproof chamber between the core and the sleeve at the position of the opening and a seal-tight engagement of the core at the position of the V-shaped slot. Upon sliding the sleeve so as to permit a desired part of the V-shaped slot to be brought within the confines of the chamber, a controlled volume of high pressure fluid may be dispensed through the device. The sleeve and core are provided with correlated micrometer-type vernier scale and markings whereby the volume flow that is desired may be readily attained.

5 Claims, 12 Drawing Figures

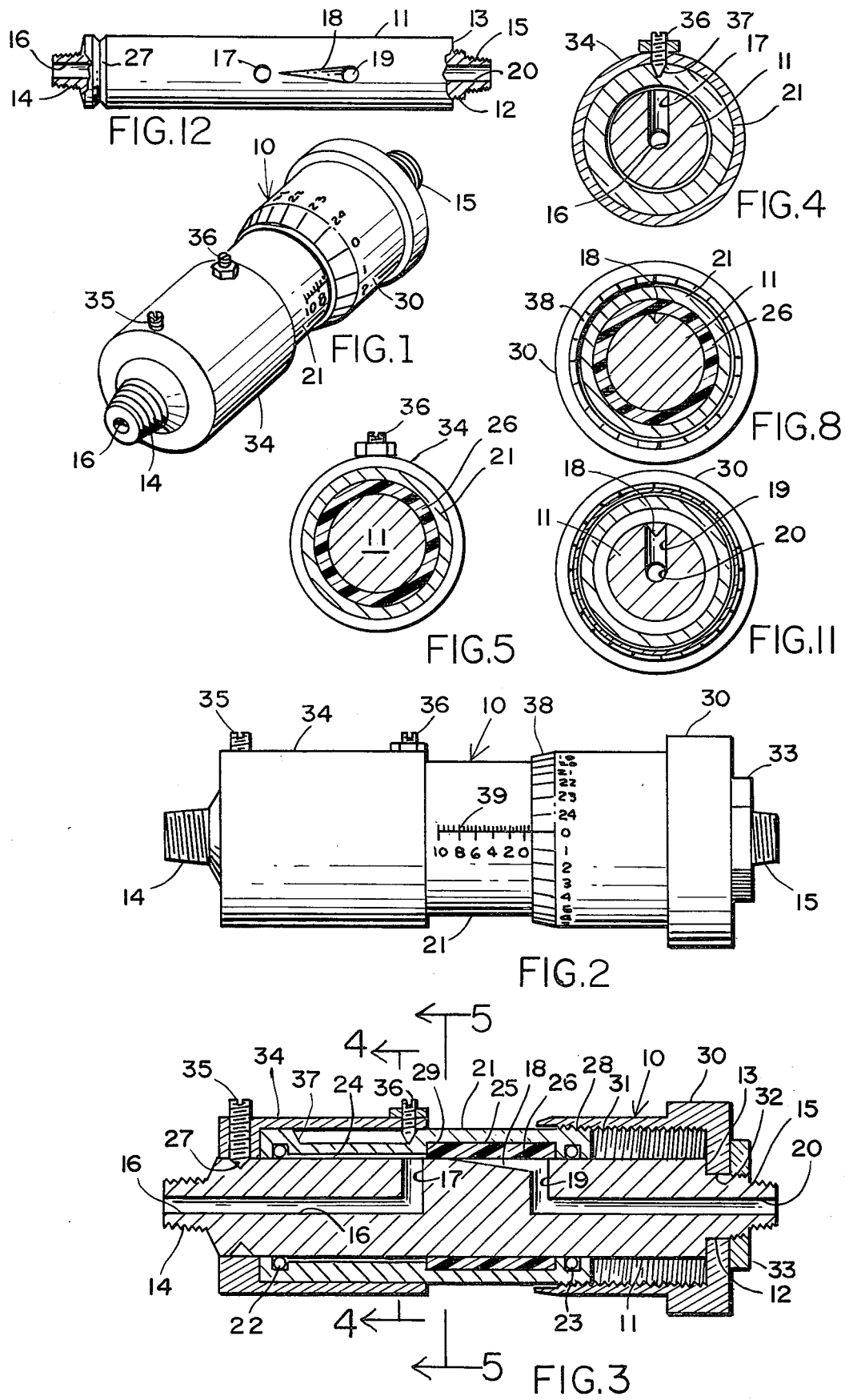

PRECISION METERING VALVE STRUCTURE

BACKGROUND OF THE INVENTION

1. Field of the Invention

This invention relates to control valves and is more particularly directed to precision metering of minute quantities of high pressure fluids to a low pressure environment.

2. Description of the Prior Art

At the present time all metering valves designed to control minute flow rates of liquids, gases and vapors are provided with aligned flow control structures such as a head and seat structure or a metering needle structure. In these devices, misalignment of the various parts which may occur in its initial fabrication or as does occur when the devices are dropped or subjected to a jarring blow or force will affect the proper functioning of the metering characteristic of the valve device. It is especially important that metering valve devices dispensing minute quantities of fluids under high pressure into a low pressure environment be efficient in their operation since an improper functioning of the fluids being dispensed may result in a dangerous condition to the users thereof. Obvious example of this situation would be in the dispensing of fluorides in drinking water and chlorine in swimming pool water.

It is contemplated by the present invention to provide a metering valve that does not require the exact alignments of head and seat structure or of a needle valve construction but instead consists of a one piece core structure in combination with a sliding sleeve that controls the volume of high pressure fluids therethrough.

BRIEF SUMMARY OF THE INVENTION

Therefore a principal object of the present invention is to provide a precision metering valve for the metering of minute quantities of a fluid from a high pressure environment to a low pressure environment in a consistently accurate and efficient manner.

Another object of the present invention is to provide a precision metering valve for metering fluids under pressure wherein the valve is not dependent upon the alignment of a head and seat or of a needle and orifice in order to operate properly, but in fact lends itself to the use of plastics or other nonmetallic materials in the manufacture of its fluid handling parts thereby being capable of controlling the flow of highly corrosive fluids.

A further object of the present invention is to provide a precision metering valve for high pressure fluids whose parts can be produced by screw machines, and therefore are relatively inexpensive in cost and simple to manufacture and assemble.

A still further object of the present invention is to provide a precision metering valve for dispensing high pressure fluids into an environment of low pressure whose structure lends itself to the use of a micrometer type vernier scale for setting predetermined flow rates between the valve inlet and outlet.

With these and other objects in view, the invention will be best understood from a consideration of the following detailed description taken in connection with the accompanying drawings forming a part of this specification, with the understanding, however, that the invention is not confined to any strict conformity with the showing of the drawings but may be changed or modified so long as such changes or modifications mark no material departure from the salient features of the invention as expressed in the appended claims.

BRIEF DESCRIPTION OF THE DRAWINGS

In the drawings:

FIG. 1 is a perspective view of a metering valve constructed in accordance with my invention.

FIG. 2 is a side elevational view with the vernier shown at the full off position.

FIG. 3 is a longitudinal cross sectional view thereof.

FIGS. 4 and 5 are transverse cross sectional views taken along the lines 4—4 and 5—5 respectively of FIG. 3.

FIG. 8 is a cross sectional view taken along the line 8—8 of FIG. 7.

FIG. 11 is a cross sectional view taken along the line 11—11 of FIG. 10.

FIG. 12 is a plan view of the core of my metering valve as shown removed from the valve structure.

DESCRIPTION OF THE PREFERRED EMBODIMENT

Figure 6:
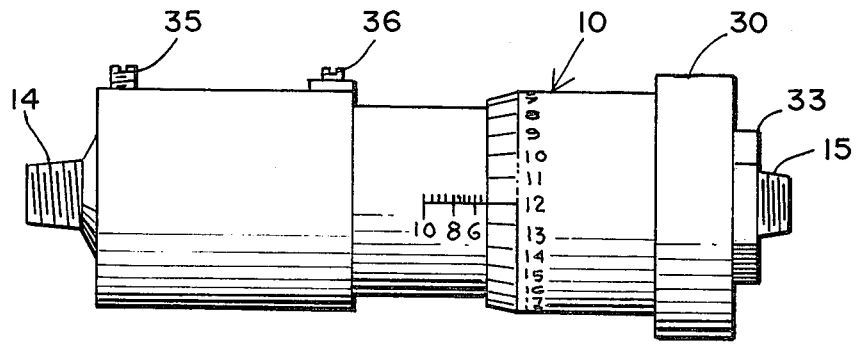
FIG. 6 is a side elevational view of my metering valve with the vernier indicating a partial opening of the valve.
Figure 7:
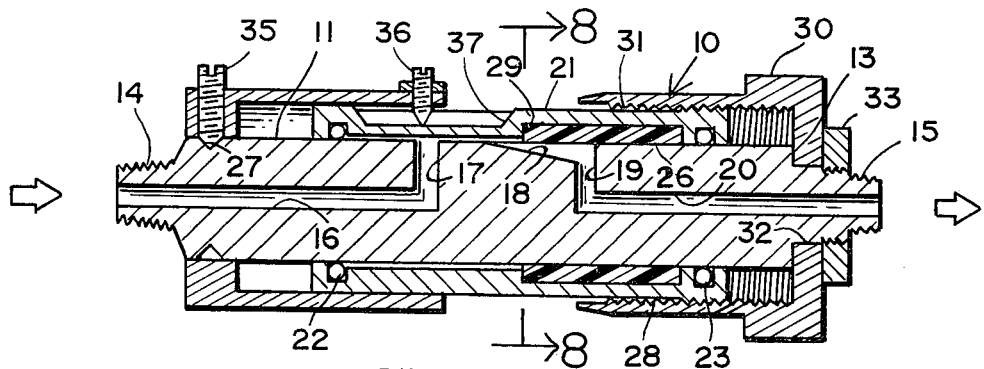
FIG. 7 is a longitudinal cross sectional view thereof.

Referring to the drawings wherein like numerals are used to designate similar parts throughout the several views, the numeral 10 refers to a metering valve device constructed in accordance with my invention and consisting of a solid cylindrical core 11 of constant diameter along substantially its full length to adjacent an end thereof wherein the diameter is smaller as at 12 to form a shoulder 13. The end portions 14 and 15 of the core 11 are threaded to form the inlet and outlet respectively of my metering valve.

At the inlet 13 there is an axially disposed inlet duct 16 that extends partially through the core 11 communicating with a bore 17 that extends radially to the surface of the core 11. In spaced relation to the bore 17 there is a V-shaped groove or slot 18 formed on the surface of the core 11, the slot 18 lying in a plane passing through the axis of the core 11 and the bore 17 with the vertex of the groove 18 being situated on the surface of the core 11 and the groove 18 increasing in cross sectional area in the direction away from the bore 17. The groove 18 communicates with a radially disposed bore 19 that extends to an axially disposed bore 20 that forms the outlet duct 20 at the threaded outlet 15. Extending peripherally about the inlet end portion 14 of the core 11 is a V-shaped notch 27. The core 11 is slidably mounted in a sleeve 21 that is provided with grooves at each end thereof for receiving O-rings 22 and 23 that bear against the outer surface of the core 11 to seal against any leakage of fluids therethrough. The inner diameter of approximately one-half of the sleeve 21 as at 24 is slightly larger than the outside diameter of the core 11, while the remainder of the core 11 extending to adjacent the O-seal 23 is much larger as at 25 for receiving and seating a plastic sleeve 26 made preferably of elastomer and the like. The inner diameter of the elastomer sleeve 26 is identical to the outside diameter of the core 11 so that a seal is formed and no fluid can flow therebetween. The elastomer sleeve 26 may be readily positioned in the slotted portion 25 by merely collapsing the sleeve 26 longitudinally as it is inserted into the sleeve 21 and then permitted to expand into position. If this is found not to be practicable, then the sleeve 21 will have to be made in two parts to receive the plastic sleeve 26. A peripheral shoulder 29 is formed at the juncture of the portions 24 and 25 of the sleeve 21. As indicated hereinafter in greater detail, the position of the shoulder 29 with relation to the duct 17 and groove 18 determines the rate of flow of fluid through the metering device 10.

The sleeve 21 is threaded at 28 for receiving the cap 30 which is threaded on its inner surface at 31. The cap 30 is provided with a bore 32 that fits over the outlet 15 and bears against the shoulder 13. This arrangement permits the cap 30 to rotate about the sleeve 21 but prevented from longitudinally movement therealong. A nut 33 threaded on the inlet 15 secures the cap 30 in position. To prevent the rotational movement of the sleeve 21, a second sleeve 34 is seated on the core 11 at the inlet 14 and extends over the sleeve 21. A set screw 35 threadedly mounted on the sleeve 34 extends into the groove or notch 18 to secure the sleeve 34 against any movement with relation to the core 11. A second set screw 36 that is threadedly mounted at the other end of the sleeve 34 extends into a longitudinally extending groove or notch 37 formed on the outer surface of the sleeve 21. By virtue of the above described construction and arrangement of parts, when the cap 30 is rotated about the core 11, the shoulder 13 and nut 33 will prevent any longitudinal movement between the cap 30 and core 11. The sleeve 34 which is anchored by the set screw 35 to the core 11 permits the longitudinal movement of the sleeve 21 on the core 11 but prevents any rotational movement thereon. Consequently rotational movement of the cap 30 permits solely the longitudinal sliding movement of the sleeve 21 with relation to the core 11. This movement is noted by a vernier scale positioned on the edge portion 38 of the cap 30 and markings 39 formed on the surface of the sleeve 21.

In the normal use of my metering valve device for accurately metering minute amounts of a fluid such as a gas or liquid from a high pressure environment to a low pressure environment, the inlet 14 is connected to the source of high pressure fluid and the outlet 15 connected to the area of low pressure where the fluid is to be dispensed. With the cap 30 in the position as shown by FIG. 2 and the zero of vernier scale 38 at the negative side of the zero of the markings 39, the metering device 10 is at the full off position. At this full off position, the shoulder 29 is positioned between the bore 17 and the vertex of the groove or notch 18. Consequently, high pressure fluid entering the inlet duct 16 will flow into the duct 17 and will fill the chamber surrounding the core 11 between the O-ring 22 and the seal sleeve 26 at the position of the shoulder 29. No fluid will flow past the sleeve 26.

Figure 9:
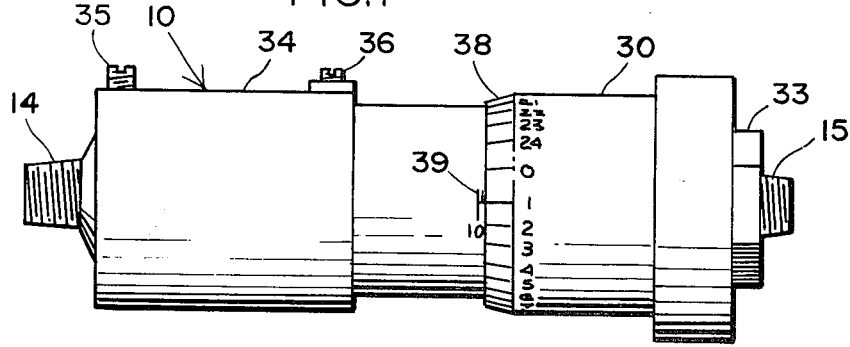
FIG. 9 is a side elevational view showing the vernier at the full open position of the metering valve.
Figure 10:
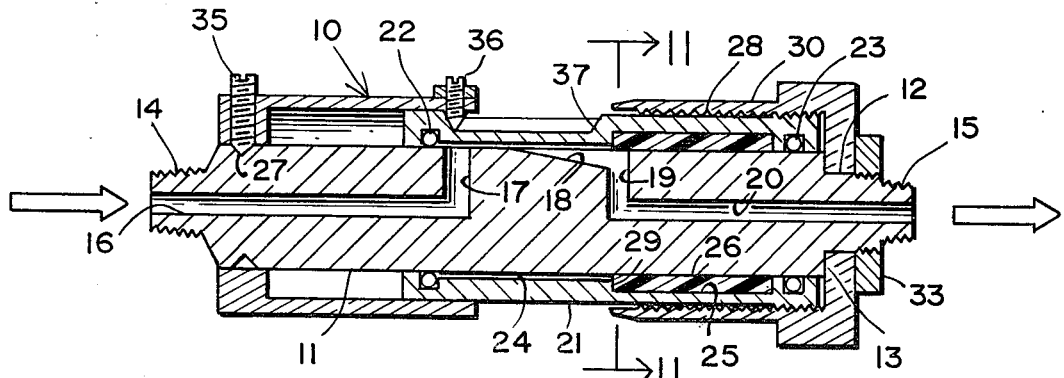
FIG. 10 is a longitudinal cross sectional view thereof.

Upon rotating the cap 30, the sleeve 21 will slide longitudinally on the core 11 in the direction of the cap 30. When the vernier scale 38 has its zero marking on the zero of the gradation markings 39, then the shoulder 29 will be positioned at the vertex of the groove 18 with the extreme edge portion of the sleeve 26 engaging the outer surface of the core 11 to prevent any flow of high pressure fluid into the groove 18. Any further rotation of the cap 30 will now permit high pressure fluid to flow past the groove 18, into the duct 19 to be discharged through the outlet duct 20. The amount or volume of fluid under pressure being discharged through my metering valve device 10 is determined by the position of the shoulder 29 with relation to the V-shaped notch or groove 18. Since the cross sectional area of the V-shaped notch 18 increases in the direction of the duct 19, then as the shoulder 29 moves in that direction greater volumes of fluid under pressure is permitted to flow therealong. When the shoulder 29 is positioned in coplanar relation with the radial duct 19 as shown by FIGS. 9 and 10 the maximum volume of fluid under pressure will be flowing through my device 10 and the vernier scale 38 will be positioned at the numeral 10 of the gradation markings 39.

From the above description of my metering valve device taken in connection with the drawings, one can readily note the rugged construction of the valve proper and the ability of the device to deliver precise amounts of relatively small quantities of fluid under high pressure to an environment of low pressure. Also, there is no possibility of the metering structure becoming out of adjustment or misaligned by continued use, mis-handling or by accidents such as by dropping. Upon determining the flow rate of a fluid at a particular setting of the vernier scale, the flow rate will remain constant so long as the pressure, temperature, etc. of the fluid remains the same so that once established, the settings will deliver the desired amounts of fluid.

Having disclosed my invention, what I claim as new and desire to secure by Letters Patent of the United States is:

1. A metering valve device for dispensing minute quantities of a fluid from a high pressure to a low pressure environment comprising a core member having an inlet and an outlet, sleeve means mounted on said core member, said sleeve means having a first portion whose inside diameter is slightly greater than the outside diameter of said core forming a chamber about said core member, and sealing means mounted on said sleeve means at said first portion preventing the escape of fluid from said chamber, an opening formed at the surface of said core member within the confines of said chamber, first duct means connecting said opening and said inlet, said core member having a substantially V-shaped groove in spaced relation to said opening, said groove having a vertex and leg portions extending in a direction away from said opening, said vertex of said groove being on the surface of said core member and forming a fluid passageway whose cross sectional area increases in the direction away from said vertex, second duct means connecting said V-shaped groove and said outlet and means moving said sleeve means on said core member whereby any desired portion of said V-shaped groove may be positioned within the confines of said chamber for controlling the rate of flow of fluid from said inlet to said outlet.

2. The structure as recited by claim 1 wherein said sleeve means having a second portion whose inside diameter is substantially equal to the outside diameter of said core member and in contact relation with said core member thereby sealing the juncture of said second portion and said core member.

3. The structure as recited by claim 2 wherein said core member being substantially cylindrical in shape, said sleeve means being slidably mounted on said core member and said sleeve moving means comprising a cap rotatably mounted on said core member at said outlet, shoulder means preventing the sliding movement of said cap on said core member, interengaging threaded means on said cap and said sleeve means whereby upon the rotation of said cap, said sleeve is slid along said core member and further sleeve means mounted on said core and said first named sleeve means preventing the rotational movement of said first named sleeve means.

4. The structure as recited by claim 3 wherein said first named sleeve means having a slotted portion at said second portion and a further sleeve mounted in said slotted portion engaging said core member preventing the escape of fluid between said last named sleeve and said core and said sealing means at said first portion comprising an O-ring mounted on said first named sleeve means.

5. The structure as recited by claim 4 taken in combination with a further O-ring mounted on the free end of said first named sleeve means at said second portion and scale markings formed on said cap and said sleeve indicating the rate of flow of fluid through said metering valve device.

* * * * *